Aug. 19, 1969 R. B. PETERS 3,461,730
ACCELEROMETER
Filed April 2, 1965 2 Sheets-Sheet 1
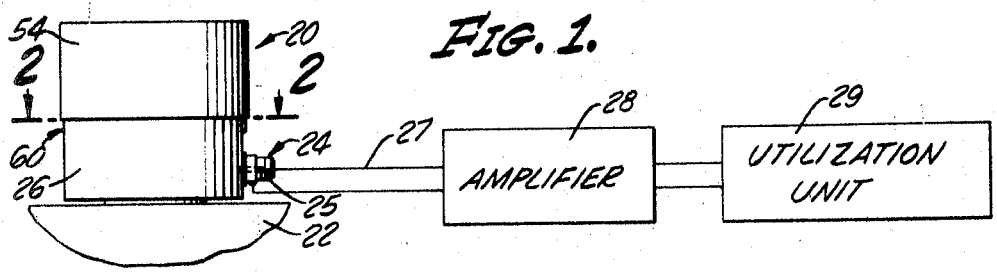
FIG. 1.
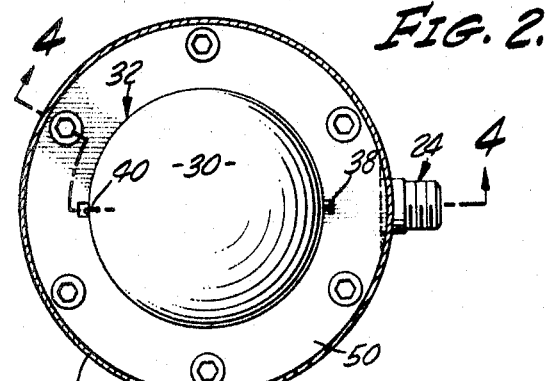
FIG. 2.
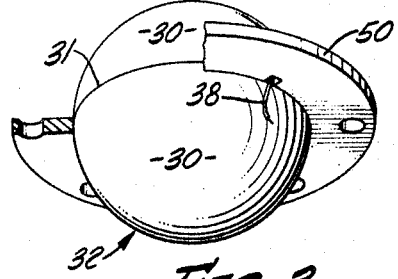
FIG. 3.
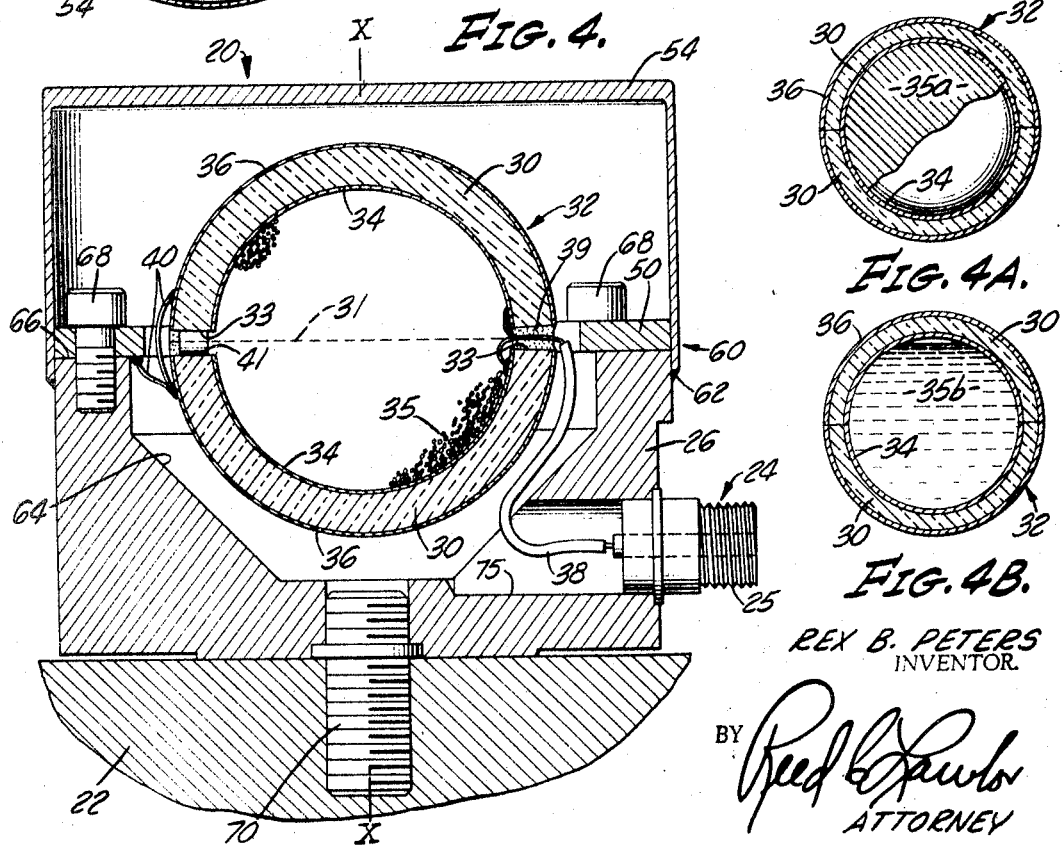
FIG. 4.
FIG. 4A.
FIG. 4B.
REX B. PETERS
INVENTOR.
BY Reed C. Lawton
ATTORNEY Aug. 19, 1969  R. B. PETERS  3,461,730
ACCELEROMETER
Filed April 2, 1965  2 Sheets-Sheet 2

REX B. PETERS
INVENTOR.
BY
ATTORNEY

United States Patent Office 3,461,730
Patented Aug. 19, 1969

3,461,730
ACCELEROMETER
Rex B. Peters, Pasadena, Calif., assignor to Endevco Corporation, Pasadena, Calif., a corporation of California
Filed Apr. 2, 1965, Ser. No. 444,985
Int. Cl. G01p 15/08
U.S. Cl. 73—517
16 Claims

ABSTRACT OF THE DISCLOSURE

This omnidirectional accelerometer employs a container composed of a piezosensitive (e.g. piezoelectric or piezoresistive) material, which is substantially filled with an inertial material, such as liquid or powder having liquid-like properties. The container may be spherical or cylindrical or the like. It is supported at a number of points in its equatorial zone by means of a cantilever-type support structure which is attached to the object being tested. Case effects are substantially eliminated and the output signal is independent of the direction of acceleration so long as the acceleration is large compared with gravity.

---

This invention relates to an improved device for detecting change in the motion of an object and more particularly to a device for measuring acceleration or for detecting when the magnitude of acceleration of an object exceeds a predetermined threshold irrespective of the direction of the axis of acceleration.

For convenience in reference, the motion detecting device of this invention will often be referred to herein as an accelerometer. Such an accelerometer is mounted within some sort of housing or on some other support structure which is characterized by one or more axes.

Heretofore, two different types of devices have been suggested for use in measuring the magnitude of acceleration of an object irrespective of the axis of acceleration relative to the axis of the accelerometer. In one arrangement, three accelerometer units have been mounted in a common housing with each of the accelerometer units having an axis of maximum sensitivity, and with the three axes of the accelerometers being mutually perpendicular to each other. When using such a device, if the signals produced by the three accelerometers are merely added together, the device has the inherent characteristic of having a maximum sensitivity along a single axis and no sensitivity along an axis in a plane perpendicular thereto. To avoid this pitfall, the signals produced by the accelerometers have been used to develop other signals proportional to the square of components of acceleration along the three axes of the respective accelerometers and these three squared signals have been added together.

Usually an accelerometer has a linear response, that is, it produces a signal which has an amplitude proportional to the acceleration. Consequently, to attain a desired combined output which is indicative of the acceleration irrespective of its direction relative to the three axes of the three accelerometer units, additional electrical equipment is required to convert the signal produced by each accelerometer into one which is proportional to the square of that signal, and further additional electrical equipment is required for combining the three squared signals. Such equipment is complex, bulky, and expensive.

In a second type of device that has been proposed heretofore for the solution of this problem a sphere of solid material has been cast within a shell of piezoelectric material which in turn has been supported throughout its entire external surface in a mounting block or case. In such a device, the piezoelectric shell is compressed on one side and is extended on the opposite side when subjected to acceleration. The compression causes an increase in the electric charge on the spherical surfaces of the shell while the extension causes a reduction in charges. The two effects tend to compensate for each other leaving only a very small residual charge for producing an electrical voltage between the inner and the outer surfaces of the shell.

The charge on the shell is produced not only by virtue of the displacement of the solid material cast within the shell, but also because the mounting block is compressed (or extended) when subjected to acceleration.

This is because, when such a device is mounted on an object undergoing tests, the block or case itself is subjected to a compressive force or an extending force when the object is subjected to acceleration. The amount of extension or compression depends not only on the acceleration of the object but also on the sense of the acceleration relative to the surface of contact between the motion detector and the object. This type of unit, therefore, is directionally sensitive along the axis of extension and compression.

The amplitudes of the additional signals due to the effect of the case ("case effect") depend on the direction of the acceleration and are often much greater than the residual signal caused by the differential effect of the inner solid sphere as described above.

Spherical piezoelectric elements have also been used heretofore in other structures useful for other purposes. For example, they have been used to support a body of liquid which transmits hydrostatic pressure to the inner portion of the shell by means of a piston slideably movable in the shell and coupled to an external movable element such as a cone of a loudspeaker. Such a structure is selectively sensitive to acceleration along the axis of motion of the piston.

One of the objects of this invention is to provide an accelerometer which produces about the same output signal irrespective of the direction of the acceleration relative to the axes of the accelerometer without the need for using electrical equipment to convert output signals into other signals, such as signals which are the square of the output signals of individual accelerometer units.

Another object of this invention is to provide an improved motion sensitive device employing a spherical piezoelectric shell mounted in such a way that it is not directionally sensitive due to the action of a case or block in which it is mounted, and also provided with an inertial charge within its cavity which, when the device is subjected to acceleration, will act primarily to compress the piezoelectric element on one side of the shell without causing it to be substantially extended on the opposite side.

Thus it is an object of the invention to provide an acceleration detector in which the case effect is non-existent or nearly non-existent.

Broadly, in accordance with this invention, a hollow container of spherical or similar shape having a wall composed of piezosensitive material is filled with a charge of solid inertial material without any substantial precompression, the container is dynamically balanced and is supported in its equatorial zone on an object undergoing tests, and means are provided to detect changes in the electrical property of the piezosensitive material. In the best embodiment of the invention now known, the piezosensitive material is piezoelectric. However, it may be piezoresistive or may have other electrical properties that change when the wall material is subjected to strain. The invention is described herein with reference to specific embodiments thereof that employ piezoelectric material as the hollow member.

In the best embodiment of the invention, the charge of inertial material is a body of powder or granules that just fills the space within the container.

When such accelerometer is subjected to acceleration in any direction, the solid substance presses against one side of the inner wall of the container without, however, substantially reducing the stress on the opposite inner wall of the container, and the mounting or supporting structure, because of its dynamical balance of symmetry, applies very little, if any, detrimental compression or extending forces to the piezosensitive container.

As a result, where the container is piezoelectric, signals in the form of electric potentials are developed between electrodes located on the inner and outer walls of the piezoelectric container, which signals correspond to acceleration of the object. If the piezoelectric container is spherical, the electric potential is completely independent of the direction of the acceleration. But if it is of other shapes, such as cylindrical, it may depend somewhat on the direction.

The foregoing and other features of the invention will be understood from an examination of the following description and the accompanying drawings wherein:

FIG. 1 is a schematic view of a system employing an accelerometer embodying this invention;

FIG. 2 is a plan view approximately as indicated by the line taken on the plane of 2—2 of FIG. 1 with the protective cover removed;

FIG. 3 is a partially fragmentary isometric view of the accelerometer;

FIG. 4 is a cross-sectional view taken on the line 4—4 of FIG. 2 indicating the use of a granular inertial body;

FIGS. 4A and 4B are similar fragmentary views on a smaller scale indicating different inertial bodies;

Figure 5:
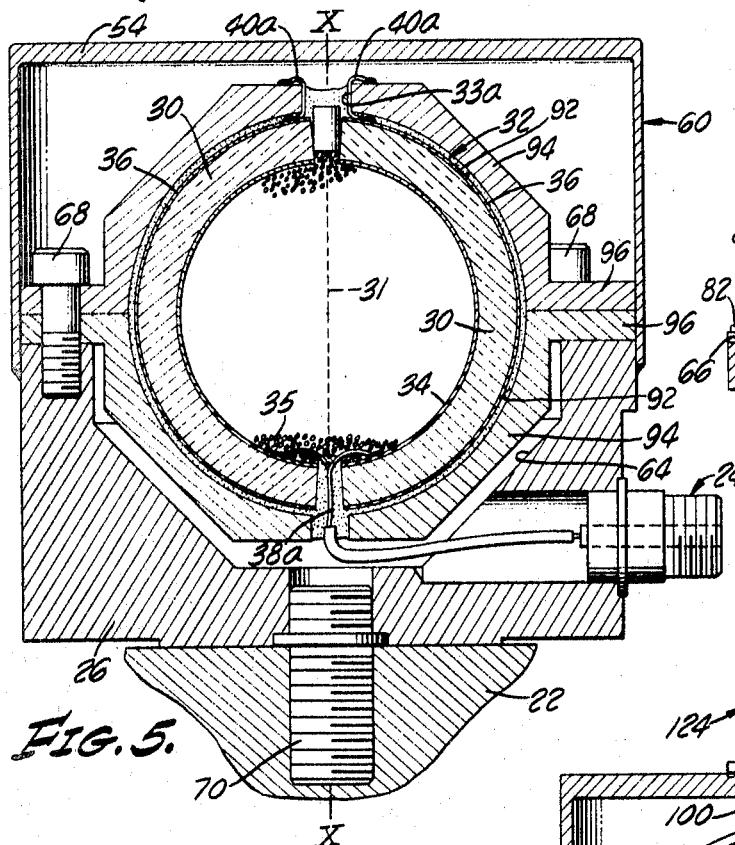
FIG. 5 is a cross-sectional view of another embodiment of the invention.

In FIG. 1 there is illustrated an omnidirectional accelerometer 20 embodying this invention and mounted upon an object 22, the acceleration of which is to be detected. The accelerometer includes an electrical connector 24 that has an externally threaded outer conductor portion 25 which is in electrical communication with a metal housing and base element 26 and also receives an axial conductor insulated therefrom and including a two-wire cable 27 by which the signals generated by the accelerometer may be applied to an electrical amplifier 28, the output of which is fed to a utilization unit 29 such as a peak-detecting voltmeter. For convenience, the accelerometer is described as if mounted upon a horizontal surface of the object 22.

In practice, an amplifier 28 is employed that has a uniform response above a frequency which is low compared with the frequencies of the acceleration to be detected. In effect, the amplifier constitutes a high pass filter, so that rapid changes in acceleration can be detected. However, the invention may be employed with other signal detecting systems.

The accelerometer or acceleration detector 20 is shown as mounted on the base element 26 and carried within a protective cover or cap 54. The detector 20 comprises a pair of hemispherical shells 30 of piezoelectric or other piezosensitive material cemented together to form a horizontal seam 31 at the equator of the hollow sphere 32 thus produced. The cement for the seam 31 is electrically non-conductive, such as an epoxy resin cement.

The two hollow hemispherical members 30 are notched to provide two holes or ports 33 at diametrically opposite points in the quatorial zone. Each of the hollow hemispherical elements 30 is provided with a hemispherical electrode 34 on the inner surface thereof and a hemispherical electrode 36 on the outer surface thereof.

The cavity within the sphere 32 is filled with a body of an intertial substance 35 which, as shown in FIG. 4, is a metal powder which just fills the cavity firmly, but without any substantial precompression between the sphere and the powder or granules. The two inner electrode parts 34 are connected together electrically by means of two wires of an electrical conductor 38 which extends through a cone or plug 39 of insulating material filling one port 33. This conductor is connected to the axial terminal of the connector 24. The outer electrode parts 36 are electrically connected together by means of two wires of a conductor 40, which is connected through the base 26 to the external electrode 25 of the connector 24.

In forming the spherical acceleration detector, the two hemispherical elements 30 are electroded on their curved surfaces only. The electrodes are formed by depositing a highly conductive material such as silver on the respective inner and outer surfaces of the hemispherical elements. The conductor 38 is connected to the inner electrodes. The two hemispherical elements are then cemented together at 31. The port that encircles the conductor 38 is filled with non-conducting material 39. The charge 35 of metal powder or granular substance is poured through the other port 33 into the cavity within the sphere and then a plug 41 is manually pressed into this port and sealed in place to seal the cavity and to confine the metal powder within the sphere under very light pressure.

A equatorial mounting means in the form of a metal ring 50 which encircles the sphere at the equatorial zone, is then cemented to the sphere both to reinforce the seam 31 between the hemispherical elements and to support the sphere 32 as a unit at its equatorial zone within the cover or cap 54 and on the base element 26.

A case 60 is thus formed of the base member 26 and the cover 54 which acts as a cap member welded at 62. The base member 26 is provided with a recess or well 64, as shown in FIG. 4, for receiving the sphere in spaced relationship with the base member 26 and is provided with a ring-shaped mounting surface 66 upon which the equatorial mounting ring 50 is secured by means of mounting screws 68. The cap member 54 above indicated is welded to the base member 26 along a line beneath the mounting surface 66. Thus, the spherical acceleration detector is rigidly supported at its equatorial zone on the mounting surface 66 of the base member 26 and is spaced from both the base member 26 and the cap 54 except for the connections thereto through the equatorial mounting ring 50. The base member 26 is provided with a bidirectional mounting stud 70 at its lower end. The mounting stud is threadably secured to the base member 26 and also to the object 22 along an axis X—X which extends through the center of the spherical acceleration detector. Except for a passage 75 in which the connector 24 is mounted, the base member 26 is circularly substantially symmetrical about the axis X—X.

The equatorial ring 50 and the base member 26 are composed of metal such as stainless steel, thus providing a path for electrical communication between the outer electrode 36 on the hemispheres 30 to the outer conductor 25 of the connector 24.

In operation, when the body 22 on which the accelerometer is mounted is subjected to acceleration, an electric signal is developed between the electrodes 34 and 36 which has a magnitude that corresponds closely to the acceleration, irrespective of whether the acceleration is along the axis X—X or is along an axis in the equatorial plane or is along some other axis. For example, when the object 22 is subjected to acceleration in a rearward direction, that is, along an axis normal to the plane of the drawing and away from the reader, the charge 25 of metal powder within the sphere presses against the inner electrode 34 on the forward side thereof by an amount proportional to the acceleration. The pressure of the metal powder on the forward surface of the inner electrode 34 causes the piezoelectric spherical member 32 to be compressed on that side of the sphere. At the same time, inasmuch as the metal powder was only lightly supported within the sphere, no substantial stress is developed in the portion of the piezoelectric sphere on the rearward side thereof. As a result, a voltage is developed between the inner electrode 34 and the outer electrode 36. This voltage appears across the electrical conductors 25 and 27 of the connector 24. If the acceleration is in any other direction in the equatorial plane, it is clear that an equal voltage is developed.

Considering now the effect of an acceleration along the axis X—X, suppose that the acceleration is in an upward direction. This causes an increase in pressure of the metal powder on the lower portion of the spherical member 32 causing it to be strained without, however, causing any substantial reduction in strain in the upper portion of the spherical element.

Two situations need to be considered when the acceleration is in a downward direction. In one situation, the acceleration is less than or equal to gravity. In the other situation, it is greater than gravity. While the downward acceleration is less than or equal to gravity, the pressure of the powder on the lower hemisphere is relieved, without the application of pressure on the upper hemisphere. This causes an electrical signal to be produced in proportion to the acceleration. When the downward acceleartion exceeds that of gravity, all the pressure is removed from the lower hemisphere and pressure is applied to the upper hemisphere. This causes a voltage to be developed by the electrodes which increases in proportion to the excess of the acceleration over that of gravity.

In any truly omnidirectional accelerometer, the output is zero when the external force is zero, and increases in proportion to the applied force. But in many applications it is desired to measure only those forces which are associated with a change in the acceleration of the accelerometer. In these cases an error arises because of the effect of gravity. In effect, gravity provides a bias of one $g$. The one $g$ bias appears to be an error in the response. The amount of the error depends on the direction of the acceleration relative to the vertical. In practice, the accelerometer of this invention is normally employed to detect accelerations which are very high compared with gravitational acceleration. Under such circumstances, the biased error in the response is immaterial as it is small compared with the accelerations being measured.

Because of the equatorial mounting, any distortion in the sphere 32 produced by virtue of its support on the base member 26 causes a voltage to be developed in the upper hemisphere which is equal and opposite to the voltage developed in the lower hemisphere. These two voltages are balanced out so that the only voltage developed between the inner electrode 34 and the outer electrode 36 is that corresponding to the pressure of the metal powder on the inner wall of the sphere.

The voltage thus generated by a given acceleration along the axis X—X is nearly equal in magnitude to the voltage developed along an axis in the equatorial plane, so long as the acceleration is large compared with the acceleration of gravity. Similarly, if an acceleration of that amount occurs in some other direction, a voltage of about equal magnitude is developed. Thus, there is very little if any of the well-known "case effect."

It would be possible, as indicaed in FIG. 4A, to employ a solid spherical member 35a within the cavity of the sphere 32 in place of the powdered or granular metal charge, provided that the spherical member is not precompressed within the spherical piezoelectric element 32. In either event, the forces due to any compression of the solid charge within the spherical electric element must be small compared with the pressures produced by the accelerations to be detected. When this relationship of pressures exists, then, when the accelerations to be detected are acting on the device, the solid charge within the piezoelectric element in effect applies pressure to only one hemispherical half of the piezoelectric element.

The charge within the piezoelectric container may also be in the form of a body of liquid 35b, as illustrated in FIG. 4B. In the best method of employing a liquid charge, a small bubble space is left within the cavity. If the bubble is a gas, such as air, it is permissable to charge the fluid with substantial precompression, but in such a case, the response time is limited by the time required for the bubble to travel from one side of the cavity to the other. The bubble may also be in the form of vapor of the liquid that is used as the inertial charge. By employing a vapor bubble, a short response time may be attained if the bubble is made very small. The well known dependence on temperature of the bubble size then limits the operation to a very small temperature range, or in other words, to laboratory or other controlled conditions.

This disadvantage is eliminated in the present instance by employing a charge of powder, which has thermal expansion properties similar to those of the enclosing sphere. In its ability to apply hydrostatic pressure under acceleration, and its inability to sustain tensile forces, the powder behaves like a liquid with a very small vapor bubble as long as the static pressure is small compared to the pressures produced by the accelerations to be detected. A powder is superior to a liquid primarily in that liquids presently known expand with temperature much faster than any suitable solid which may be used to contain it.

It is thus seen that with this invention, an accelerometer is provided which produces an electric signal which is approximately proportional to the acceleration, irrespective of the direction of the acceleration relative to any axis within the detector so long as the acceleration is large compared with that of gravity.

Figure 8:
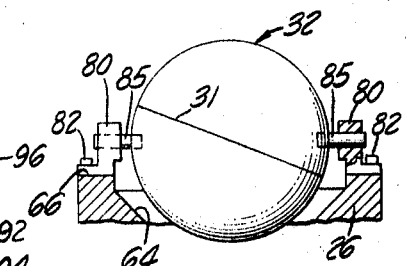
FIG. 8 shows a modified mounting structure.

While the accelerometer has been described in terms of one in which the spherical piezoelectric element is symmetrically mounted on the support member 26 by means of an annular equatorial ring, it will be understood that such annular mounting is not necessary, it being sufficient for some purposes to merely mount the spherical element 32 by attachment of diametrically opposite points to opposite legs or tines of a yoke projecting upward, for example, from mounting point on the base member 26. Such a structure is seen in FIG. 8. Here the support member or base element 26 has secured to its top surface 66 at approximately diametrically opposite points, two upstanding yoke arms or tines 80, held as by bolts 82. The upper portions of these arms 80 are provided with mounts 84 which serve to support opposite studs 85 fixed in the wall of the sphere 32 so as to support the sphere 32 in the indicated operative position. Such studs will be mounted in a manner to be electrically insulated from the inner electrode 34. The spherical element may also be supported at three or more points arranged in a dynamically balanced manner in the equatorial zone.

Figure 6:
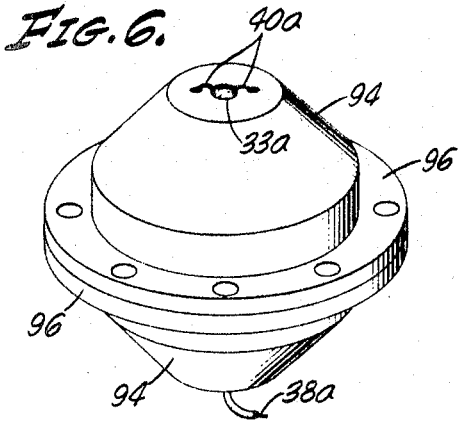
FIG. 6 is an isometric view of a portion of the accelerometer of FIG. 5.

In another embodiment of the invention illustrated in FIG. 5, the poles of the spherical element are mounted on the axis X—X of symmetry of the base 26. In this case, the spherical piezoelectric element 32 is mounted within two hemispherical recesses 92 formed within two mating conical shell members 94 which are provided with equatorial flanges 96 for supporting the acceleration detector on the base member 26. The structure of this detector is shown in FIG. 6.

In this case, the conductors 40a are connected to the outer electrode parts 36 and are led through a port 33a in the upper cone to points on the upper cone where they are soldered to the upper cone. Similarly, the conductor 38a connected to the inner electrode parts 34 is led through a port in the lower cone opposite the lower pole to the connector 24.

Figure 7:
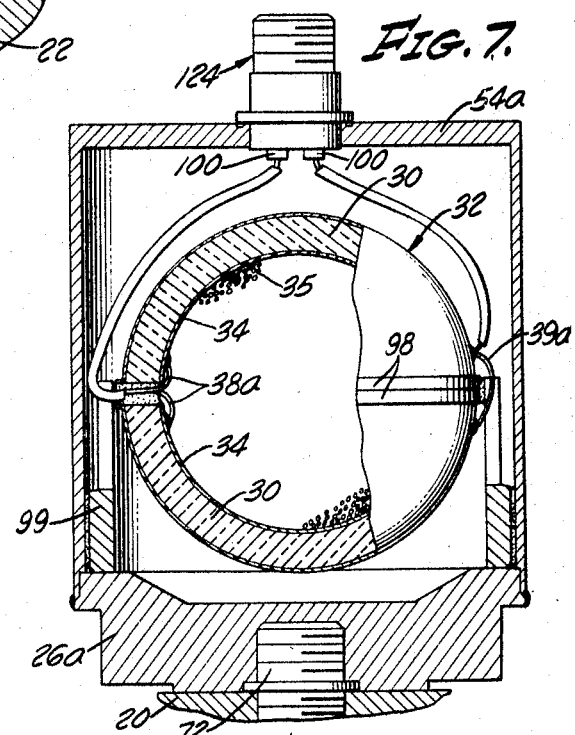
FIG. 7 is a partially broken away, sectional view of an alternative embodiment of the accelerometer.

In another alternative embodiment of the invention illustrated in FIG. 7, the spherical piezoelectric member 32 is provided with a pair of rings 98 which are cemented together at the equator and the peripheries of which are cemented to the inner wall of a tubular mounting member 99 welded to a base member 26a. In this case, hemispherical segments of the inner electrode parts 34 are connected by means of one conductor 38a and the segments of the outer electrode parts 36 are connected by means of another conductor 39a to a connector 124 which projects axially outwardly from the case along the axis X—X of the symmetry.

In this instance, the two conductors 38a and 39a are connected to terminals 100, which terminals are insulated from each other and from the case 54a thus making it possible to isolate both sets of electrodes 34 and 36 of the piezoelectric element from the case.

The structure of FIG. 5 has the advantage of providing additional strength to the spherical piezoelectric element 32 to minimize the danger of breakage. The structure of FIG. 7 is somewhat more nearly symmetrical than the other structures illustrated and thus provides more nearly uniform output regardless of the direction of the axis of the acceleration. When employing a powder or liquid inertia member as explained herein, the output from an accelerometer constructed as in FIG. 7 is greater than the output of an accelerometer constructed as in FIG. 5 if, as in this case, the piezoelectric material is responsive to tangential as well as radial forces.

Since the stiffest metals are only three to five times as stiff as available piezosensitive materials, it is impossible to eliminate case effect stresses simply by making them negligibly small. In this invention, case effects and similar effects are substantially eliminated by virtue of the "dynamic balance" of the accelerometer. Such balance is obtained by means of the symmetrical geometric arrangement of the parts of the accelerometer so that little or no output is caused by direction-dependent stresses in the piezosensitive shell. In this invention the dynamic balance causes the effect of the unwanted stresses in one part of the accelerometer to be cancelled by an equal but opposite effect caused by an unwanted stress in another part of the accelerometer. By unwanted stress, is meant one that is due to some force other than that produced by the accelerating inertial mass within the sphere. For example, in the embodiment of the invention shown in FIG. 4, when the accelerometer is accelerated sideways, in the plane of the paper, transverse forces are applied to the various parts of the accelerometer including the parts of the base 26 at the equatorial plane. In this case, there is an inwardly directed bending of the base 26 on one side thereof which would cause a compression of the sensor at its equator were it not compensated by an equal outwardly directed bending of the base on the opposite side.

Compensation is attained with respect to transverse forces by virtue of the cantilever-type construction of the support device. In this connection, it is to be noted that all the devices described for mounting the piezosensitive object equatorially are of cantilever-type construction in that the support means project from a base member that is attached to the object subjected to acceleration. This feature is present not only in the mounting means employing tines as in FIGS. 7 and 8, but in the mounting means of bowl shape illustrated in FIGS. 4 and 5.

"Dynamic balance" can be assured for accelerations in any direction by satisfying four simple geometric conditions:

(1) The sensing element, including its mounting points, has radial symmetry with respect to some point (geometric center of the sensor).

(2) The case, including the mounting points of the sensor, has radial symmetry with respect to an axis which is normal to the contact surface and passes through the geometric center of the contact surface.

(3) The axis of the accelerometer and the plane of the mounting points pass through the geometric center of the sensor.

(4) The plane of the mounting points (equatorial plane) is parallel to the surface of contact between the accelerometer and the test object.

Other sets of conditions may produce "dynamic balance" or an approximation to it, but they are not easily defined in general terms. In particular, it is obviously impractical to place the mounting points of the sensor in a true geometric plane since the equatorial mount must have a finite thickness. This departure from ideal does not cause a significant error as long as the thickness of the mount is not more than about 15% of the polar dimension of the sensing element. This 15% zone is sometimes referred to as the equatorial zone.

When employing a solid spherical member 35a, the response is not independent of direction if, as in the present case, the piezoelectric material responds to tangential as well as radial forces. More particularly, when the acceleration is horizontal, the stresses are radial. But when the acceleration is vertical, there is not only a radial stress at the top or bottom of the spherical piezoelectric element but tangential stresses occur in the equatorial plane where the piezoelectric sphere is supported. Such effects may be reduced either by employing a thick piezoelectric sphere, one in which the radial thickness is at least 25% of the radius or by mounting the piezoelectric sphere within a metal shell as illustrated, for example, in FIG. 5. The precautions required to avoid effects of such tangential stresses need not be taken if a powdered, or granular, charge is employed, or a liquid charge is employed. In effect such a powdered or granular charge possesses liquid-like properties.

It is not necessary to employ a spherical piezoelectric element to attain all the advantages of this invention. Piezoelectric containers of other shapes may be employed, which, while they may not give uniform response in all directions, nevertheless do provide a simple arrangement for producing signals which are of nearly equal response within, say, a factor of about 2, to accelerations that are large compared to one g, regardless of the direction of the acceleration. Thus, instead of employing a spherical piezoelectric element, one which is in the form of a right circular cylinder may be employed. The ends may even be closed with inert material.

Figure 9:
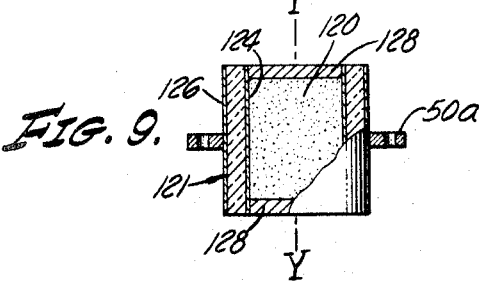
FIG. 9 illustrates a further alternative.

Thus, in such an arrangement indicated in FIG. 9, a charge 120 of powdered metal fills a cylindrical piezoelectric element 121 having electrodes 124 and 126 formed on the inner and outer surfaces thereof and in which the two ends of the cylindrical member 121 are closed by means of discs 128, 128, which need not be piezosensitive, cemented to the upper and lower ends thereof. The cylindrical member 121 is supported by means of a mounting ring 50a cemented to its outer surface midway between the ends thereof.

In this particular case, good effects are obtained if the height of the cavity within the unit is about equal to its diameter. It will be noted that when the accelerometer is accelerated along the axis Y—Y of the cylinder, radial forces acting upwardly cause electrical voltages to be developed between the inner and outer electrodes 124 and 126.

The piezoelectric material employed may be a barium titanate or lead-zirconate titanate or some other ceramic piezoelectric material capable of being electrically polarized. In practice, the piezoelectric material is polarized in a direction extending from one of the electrodes 34 and 36 to the other. In the case of the sphere the polarization is radial at all points.

For maximum effect, the metal powder should be composed of a dense material having a high yield strength, such as tungsten. Furthermore, the granular material should have a maximum cross-sectional area that is very small compared with the cross-sectional area of the cavity within the sphere. In one case with a spherical piezoelectric element having a diameter of 0.75″ and a radial thickness of 0.010″, particles had a maximum diameter of 1/1000 inch. In this particular instance, the voltage generated was approximately 50 mv./g.

In practice, devices of this type are employed to detect accelerations which are large compared with the acceleration $g$ of gravity. In this connection, it will be noted that when a unit is being used in the presence of a gravitational force there is an initial pressure corresponding to the force of gravity on the lower surface of the spherical piezoelectric element, and that an acceleration which is large compared with twice that of gravity can be readily detected irrespective of the direction of the acceleration relative to a vertical axis. Thus, the omnidirectional accelerometer of this invention may be readily employed to generate a voltage which is nearly the same for a given acceleration irrespective of the direction of the acceleration relative to a vertical line if the acceleration to be detected is greater than about 10 $g$.

It is thus seen that this invention provides a motion detecting device which is substantially equally responsive to accelerations of high value regardless of the orientation of the axis of acceleration relative to the geometrical axis of the accelerometer.

The invention claimed is:
1. An acceleration detecting device comprising:
   a hollow piezosensitive container having two end portions and an equatorial zone located therebetween;
   a charge of inertial material filling said container,
   cantilever-type mounting means having a base member attachable to an object undergoing test and having support means projecting from said base member, said support means being attached to said container at positions in said equatorial zone,
   means for detecting electric potentials developed between the inner and outer surfaces of said piezosensitive container cause by pressure exerted by said charge on the inner surface of the container under acceleration.

2. An acceleration detector as in claim 1 wherein said charge of inertial material is supported with said container without substantial precompression.

3. A device as in claim 1 wherein said inertial material is a solid sphere.

4. A device as in claim 1 wherein said container is a hollow sphere.

5. A device as in claim 1 wherein said inertia material is a powder.

6. A device as in claim 4 wherein said limited areas are diametrically opposed in an equatorial zone of said sphere.

7. An omnidirectional motion detecting device comprising:
   a hollow piezoelectric member having two end portions and an equatorial zone located therebetween;
   an inertial element confined within said member;
   a yoke-like structure comprising a base element and a support element, said base element being adapted to be secured to an object whose motion is to be detected;
   said support element comprising a plurality of support members spaced from said base element and attached to said piezoelectric member at positions in said equatorial zone while said end portions are resiliently supported relative to said equatorial zone;
   means for attaching said base element to an object undergoing test; and
   means for detecting electric potentials developed between the inner and outer surfaces of said hollow piezoelectric member that are developed between said surfaces in response to a change in pressure asserted by said inertial element on the inner wall of said hollow member when said object is subjected to acceleration.

8. In an acceleration detector:
   a spherical hollow body formed of a piezosensitive material, said hollow body having two end portions and an equatorial zone located therebetween;
   an external spherical electrode on the outer surface of said hollow body;
   an internal spherical electrode on the inner surface of said hollow body;
   electrical connections to said electrodes;
   a body of inertial material substantially filling said hollow body;
   a cantilever-type mounting structure including a base member for attachment to an object to be tested, and including support means projecting from said base member, said support means being secured to said hollow body only in the equatorial zone of said hollow body and mounting said hollow body in spaced relation to said base member; and
   means connected to said electrical connections for detecting electric potentials developed between said electrodes in response to change in pressure exerted by said inertial material on the inner wall of said hollow body.

9. An acceleration detector as in claim 8 wherein said inertial material has liquid-like properties.

10. An acceleration detector as in claim 8 wherein said support means spacing said hollow body from said base member is in the nature of a yoke structure.

11. A device as in claim 8 wherein said support means secured to said spherical hollow body includes a ring encircling said hollow body in an equatorial zone thereof.

12. A device as in claim 8 wherein the points of attachment of said support means of said spherical hollow body are diametrically opposed.

13. An omnidirectional motion detector including:
   a hollow body formed of piezosensitive material, said hollow body having two end portions and an equatorial zone located therebetween;
   an electrode covering the outer surface of said body;
   an electrode lining the inner surface of said body;
   electrical connections to said electrodes;
   a body of inertial substance in said hollow body;
   means connected with said electrical connections for detecting electrical potentials developed between said electrodes in response to pressure change by said inertial body against the inner wall of said hollow body; and
   a cantilever-type mounting structure including base means for attachment to an object to be tested, and also including support means having spaced portions for equatorial attachment to said hollow body to support said hollow body in spaced relation to said base means.

14. An acceleration detecting device comprising:
   a hollow piezosensitive container having two end portions and an equatorial zone located therebetween,
   a charge of inertial material substantially filling said container without substantial precompression,
   mounting means for supporting said container on an object subjected to acceleration, said mounting means having support means attached to said container at a plurality of positions in said equatorial zone, said support means and said container being so shaped and said positions being so located about said equatorial zone that stresses on said container other than those produced by the accelerating force on said charge are substantially balanced.

15. An acceleration detector as defined in claim 14 wherein said container is composed of piezoelectric material and wherein electrodes cover the inner and outer surfaces of said container.

16. An acceleration detector as defined in claim 14 wherein said charge of inertial material has liquid-like properties.

References Cited

UNITED STATES PATENTS

| | | | |
|---|---|---|---|
| 2,808,524 | 10/1957 | Feinstein | 310—8.4 |
| 2,832,581 | 4/1958 | Youngs | 73—516 |
| 3,270,565 | 9/1966 | Hawley et al. | 73—516 XR |

FOREIGN PATENTS

| | | |
|---|---|---|
| 884,974 | 7/1953 | Germany. |

RICHARD C. QUEISSER, Primary Examiner

JAMES J. GILL, Assistant Examiner